3,484,749
ADAPTIVE ELEMENT

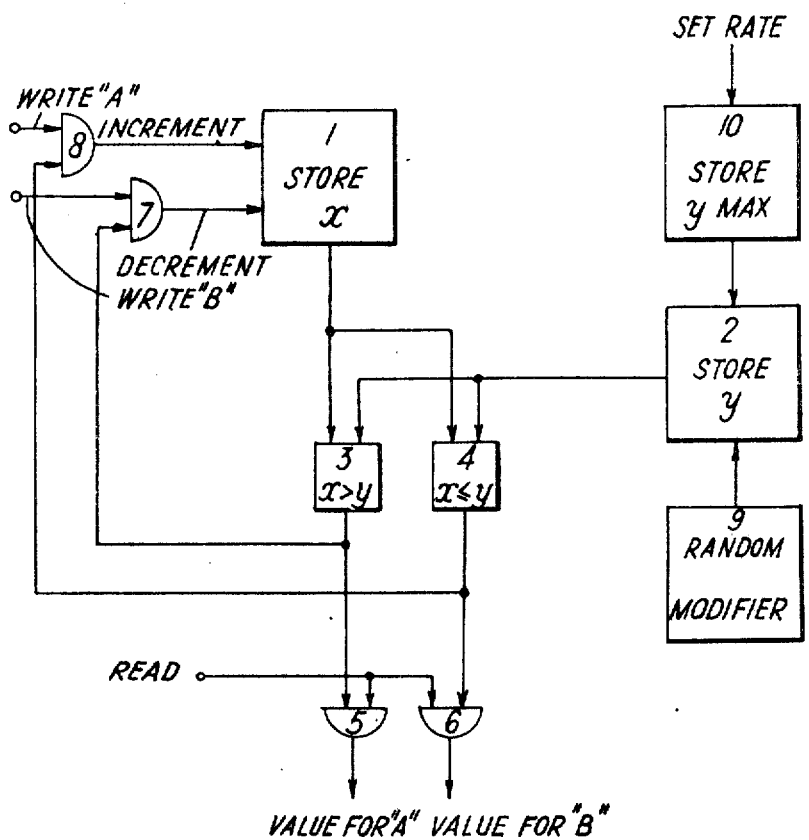

John Hugh Andreae, Christchurch, South Island, New Zealand, and Peter Lawrence Joyce, Bishop's Stortford, and Brian Ronald Gaines, Cambridge, England, assignors to International Standard Electric Corporation, New York, N.Y., a corporation of Delaware
Filed Mar. 14, 1967, Ser. No. 623,052
Claims priority, application Great Britain, Apr. 1, 1966, 14,523/66
Int. Cl. G11b *13/00*
U.S. Cl. 340—172.5          1 Claim

ABSTRACT OF THE DISCLOSURE

A randomly modified store is used to read out probabilistically the value of an adaptive element which has increment and decrement lines. The store value is compared with that of the element. The value held in the element is read out as stochastic sequence and a signal is fed back to the decrement/increment line if the contents of the element exceed/do not exceed the contents of the store. The store is all the time subject to random modification and its maximum permitted value is externally controllable. The response rate of the adaptive element is thus indirectly varied by changing the maximum permitted value.

---

The present invention relates to adaptive information storage devices, that is to say, to finite-state memory devices whose stored values progressively approximate to or estimate statistical measures of their inputs, and has particular application in connection with elements such as that described in the patent of J. H. Andreae et al. No. 3,411,138 for Self-Adaptive Information Storage Devices.

In what follows, the expression "adaptive element" is taken to mean an information storage device which includes at least one element whose state or condition determines a range of storage levels, the state or condition of the said element or elements being arranged to change in such a way in response to signal inputs to the device that the magnitude of the change in the stored level made by the device in response to an individual input signal has a value determined directly or statistically by the values of two or more parameters which include the value of the input signal and also the level stored in the device immediately prior to receiving the said signal.

An adaptive element is therefore a special form of counter.

In what follows, the term "information processing arrangement" is taken to include for example the backing store of a digital computer, the computer itself, the central processor and decision elements therein, as also other methods of or devices for implementing numerical computation, simulation, speech or pattern recognition, process control and the storage of intermediate results in a logical or arithmetical operation.

The expression store value, counter value, and value of the element, which strictly speaking are ungrammatical, are used in what follows as abbreviations for the value of $y$ of a second quantity which is held in randomly modified store, the reading $x$ held in the counter, and the value of the quantity which is stored in the adaptive element; in other words the contents of the store, of the counter and of the element respectively.

For constant environmental conditions, the value of the element is a function to which the sequence of successive counter values converges.

The term instantaneous store value is used to mean the current value of the randomly modified store at the instant of sampling.

Counters having incrementing and decrementing facilities may either possess separate increment and decrement lines or else may distinguish by the form of the signal (e.g. $+1$ or $-1$) whether incrementing or decrementing is intended.

According to the invention there is provided an information processing arrangement which includes an adaptive element as hereinbefore defined and having provision for interconnection for operation in a manner wherein the rate of variation of the value of the element is externally controlled.

The invention thus provides a way of reading the value of an adaptive element probabilistically and of modifying the value of an element probabilistically in accordance with the signals which are input.

The invention further resides in the method described and in apparatus or circuitry which incorporates the arrangement described.

The above-mentioned and other features of the invention will become more apparent and the invention itself will best be understood by reference to the following description of an embodiment of the invention, taken in conjunction with the single figure of the accompanying drawings which is a block diagram of an embodiment of the invention.

In the embodiment illustrated, 1 is a counter having increment and decrement lines and holding a value $x$ of a first quantity. A store 2 holds the value $y$ of a second quantity. The value $x$ is limited to lie in that range which can be represented as a level or combination of levels of the multistable device or devices in the counter. The value $y$ is constrained so as to lie in the range between zero and $y$ MAX, where $y$ MAX is determined by an external control and where $y$ MAX is in any case not greater than the maximum value which the adaptive element can assume.

The values $x$ and $y$ are compared by comparator units 3 and 4, outputting a signal when $x$ is strictly greater than $y$ and 4 outputting a signal when $x$ is less than or equal to $y$. The output 3, which is present if $x$ is greater than $y$ is gated at AND gate 5 with a "read" signal and the value of $x$ (stored in 1 as a combination of states of multistable devices, for example bistables) is read out as a sequence of pulses, giving the value of the element for condition A.

The output of 3 is separately gated also at the AND gate 7 with the "write" command signal for condition B (i.e. not-A) and applied to the decrement line of the counter 1.

Thus if on the application of a read pulse the contents of the counter 1 exceed the contents of the store 2, the sequence representing the value of the element for A is read out and the counter is decremented by the application of a "write B" pulse, where B is the condition not obtaining for the sequence which is read out.

Similarly, if $x$ is less than or equal to $y$, the sequence representing the contents of the adaptive element is obtained by gating at AND gate 6 the "read" signal with the output of comparator unit 4.

The output of 4 is separately gated also at the AND gate 8 with the command signal for condition A and applied to the increment line of the counter 1. Thus if the contents of the counter are less than the contents of the store, the sequence corresponding to condition B is output and the value of the counter is incremented by a "write A" pulse.

The duration of the "read" signal is sufficient to allow the full word length of the adaptive element to be read out.

An obvious alternative arrangement is the embodiment in which the comparator unit 3 is activated when the counter value is greater than or equal to the store value, while the comparator unit 4 is only activated by a counter value which is strictly less than the store value.

The signals "write A" and "write B" are obtained e.g. when a sensor at an interface registers a variations in input from the environment or when a decision followed by branching sends an ON or an OFF signal to the adaptive element.

The store value is continually being randomly modified by signals from a random modifier 9. Thus comparisons are continually being made by the comparators 3 and 4 and signals are continually being sent to gates 7 and 8 or the increment and decrement lines of the counter. Thus modification of the counter value is continual, proceeding more rapidly where there is a wide divergence between $x$ and $y$, and less rapidly in the less sensitive regions where $x$ and $y$ are nearly equal.

The boxes 1 to 9, together with provision for interconnection for operation in such a way that the store value is continuously randomly modified and on the application of an appropriate signal the counter value is read out, wherein the counter value is compared with the instantaneous store value and an indication provided as to which of the values is the greater, the counter value decremented or incremented in the presence of an appropriate signal according as the counter value exceeds or does not exceed the store value, thus form an adaptive element as hereinbefore defined.

The value of $y$, though randomly varying, is maintained by an external control below a maximum value $y$ MAX.

In the embodiment illustarted, this external control is provided by a store 10 which is set at values $y$ MAX and which limits the values of the randomly modified store 2. $y$ MAX does not exceed the greatest value expressible by the adaptive element, otherwise comparator 4 would be activated more frequently than is necessary to ensure convergence in the performance of the adaptive element, which would not be the most efficient mode of operation. Limiting $y$ MAX also results in preventing overcounting by the counter.

The rate of variation of the value of the element is thus externally controllable by manually altering the contents of store 10.

The pulses "write A" and "write B" in the embodiment illustrated are complementary i.e. if B is 0, A is 1 and vice versa. However if the logic scheme employed is not simply binary, A need not be precisely not-B and conversely (for example, in a ternary logic scheme, three conditions ON, OFF and OPEN exist; there are also threshold logic schemes in which peak decision points are separated by areas of no-man's land).

The embodiment of the invention which is hereinbefore described is conveniently realized using electronic components, but may also be realized using mechanical elements or devices using magnetic, pneumatic, fluid or other forms of logic.

What we claim is:
1. An information processing arrangement comprising:
   a first counter having input increment and decrement lines, said first counter holding a value $x$ of a first quantity;
   a second counter holding a value $y$ of a second quantity;
   means coupled to the second counter to constrain the value $y$ so that it lies between zero and $y$ MAX;
   a random modifier coupled to said second counter to randomly vary the value of $y$;
   a first comparator unit coupled to said counters to produce a first signal when the value $x$ is greater than the value $y$;
   a second comparator unit coupled to said counters to produce a second signal when the value $x$ is less than or equal to the value $y$;
   said first signal is AND gated with a read signal giving the value for condition A, and said first signal is also AND gated with a write signal for condition B and applied to the decrement line of said first counter; and
   said second signal is AND gated with the read signal giving the value for condition B, and said second signal is also AND gated with a write signal for condition A and applied to the increment line of said first counter,
   whereby, on the application of the read signal, the contents of said first counter exceeds the contents of the second counter, the sequence representing the value for condition A is read out and said first counter is decremented by the application of the write signal for condition B.

References Cited

UNITED STATES PATENTS

| | | | |
|---|---|---|---|
| 3,317,900 | 5/1967 | Clapper | 340—172.5 |
| 3,341,823 | 9/1967 | Connelly | 340—172.5 |

BERNARD KONICK, Primary Examiner

JOSEPH F. BREIMAYER, Assistant Examiner

U.S. Cl. X.R.

340—173